United States Patent [19]
Karam, II

[11] Patent Number: 5,381,288
[45] Date of Patent: Jan. 10, 1995

[54] CENTER MOMENT SUSPENSION ASSEMBLY

[75] Inventor: Raymond M. Karam, II, Goleta, Calif.

[73] Assignee: Applied Magnetics Corporation, Inc., Goleta, Calif.

[21] Appl. No.: 899,449

[22] Filed: Jun. 16, 1992

[51] Int. Cl.$^6$ .............................................. G11B 5/48
[52] U.S. Cl. ........................................................ 360/104
[58] Field of Search ........................................... 360/104

[56] References Cited

U.S. PATENT DOCUMENTS

| | | |
|---|---|---|
| 3,310,792 | 3/1967 | Groom et al. |
| 3,397,289 | 8/1968 | Pfost et al. |
| 3,922,776 | 12/1975 | Alger et al. |
| 3,931,641 | 1/1976 | Watrous |
| 4,091,428 | 5/1978 | Saito et al. |
| 4,141,050 | 3/1979 | Wiseley |
| 4,167,765 | 9/1979 | Watrous |
| 4,293,884 | 10/1981 | Schiller |
| 4,302,523 | 11/1981 | Audran et al. |
| 4,422,115 | 12/1983 | Spash |
| 4,449,155 | 5/1984 | Meier et al. |
| 4,449,213 | 5/1984 | Noborimoto et al. |
| 4,456,938 | 6/1984 | Baasch et al. |
| 4,458,398 | 7/1984 | Goldstein et al. |

(List continued on next page.)

FOREIGN PATENT DOCUMENTS

| | | | |
|---|---|---|---|
| 18037 | 1/1982 | Japan . | |
| 48709 | 3/1982 | Japan . | |
| 64649 | 4/1983 | Japan . | |
| 54069 | 3/1984 | Japan | 360/104 |
| 17230 | 1/1985 | Japan . | |
| 115031 | 6/1985 | Japan . | |
| 247854 | 12/1985 | Japan . | |
| 182642 | 8/1986 | Japan . | |
| 239470 | 10/1986 | Japan | 360/104 |
| 248241 | 11/1986 | Japan . | |
| 145581 | 6/1987 | Japan | 360/104 |
| 188460 | 7/1992 | Japan | 360/104 |

OTHER PUBLICATIONS

Magnetic Head-Lines, Applied Magnetic Corporation, Nov. 1990.
A Design of High Performance Inline Head Assembly For High-Speed Access, Ohwe, et al., IEEE, 1990.
Optical Disk Drive, The Ideal System for Accuracy, Efficiency, and Reliability, Nissho Electronics.
Dynamics and Design of Read/Write Head Suspensions For High-Performance Small Form Factor Rigid Disk Drive, Denny K. Miu, et al., Technical Report No. 90-15, Oct. 1990.

*Primary Examiner*—John T. Kwon
*Attorney, Agent, or Firm*—Knobbe, Martens, Olson & Bear

[57] ABSTRACT

A suspension for a rigid disk drive suspends a magnetic head over a recording disk in a cantilever fashion. The suspension includes a load beam and a spring assembly which are integrally formed together. The spring assembly includes a bonding tab suspended within the plane of the load beam by two flexible longitudinal arms connected to two flexible transverse arms. The flexible arms permit the bonding tab to roll about the longitudinal axis and pitch about the transverse axis, while preventing the bonding tab from sticking in an off-axis position. The suspension design also minimizes the effect of suspension torsional resonance on the magnetic head by positioning the bonding tab within the plane of the load beam. In addition, the bonding tab defines an aperture which receives a protuberance of the magnetic head to precisely index the magnetic head with the bonding tab, and thus center the magnetic head about a load support point.

17 Claims, 6 Drawing Sheets

U.S. PATENT DOCUMENTS

| | | | |
|---|---|---|---|
| 4,504,935 | 3/1985 | Jansen. | |
| 4,514,837 | 4/1985 | Van Rosmalen. | |
| 4,520,414 | 5/1985 | Latimer et al.. | |
| 4,520,555 | 6/1985 | Gyi et al.. | |
| 4,533,967 | 8/1985 | Conly et al.. | |
| 4,542,429 | 9/1985 | Nishida et al.. | |
| 4,568,142 | 2/1986 | Iguma. | |
| 4,571,026 | 2/1986 | Maruta. | |
| 4,582,274 | 7/1984 | Charlson et al.. | |
| 4,596,444 | 6/1986 | Ushida. | |
| 4,596,448 | 6/1986 | Kikuchi. | |
| 4,609,957 | 9/1986 | Gentet et al.. | |
| 4,644,516 | 2/1987 | Musha. | |
| 4,646,283 | 2/1987 | Ito et al.. | |
| 4,669,073 | 5/1987 | Wakabayashi et al.. | |
| 4,670,804 | 6/1987 | Kant et al.. | |
| 4,740,946 | 4/1988 | Yamura et al.. | |
| 4,740,947 | 4/1988 | Ohta et al.. | |
| 4,763,314 | 8/1988 | McCaslin et al.. | |
| 4,786,999 | 11/1988 | Tanaka et al.. | |
| 4,792,875 | 12/1988 | Ohdaira. | |
| 4,794,586 | 12/1988 | Korth. | |
| 4,797,763 | 1/1989 | Levy et al.. | |
| 4,811,143 | 3/1989 | Ohashi et al. | 360/104 |
| 4,823,336 | 4/1989 | Inada et al.. | |
| 4,829,395 | 5/1989 | Coon et al.. | |
| 4,831,480 | 5/1989 | Takeda. | |
| 4,853,811 | 8/1989 | Brooks, Jr. et al.. | |
| 4,853,813 | 8/1989 | Yamanouchi | 360/104 |
| 4,868,694 | 9/1989 | Hagen. | |
| 4,876,623 | 10/1989 | Takekado | 360/104 |
| 4,882,644 | 11/1989 | Kimura et al.. | |
| 4,912,583 | 5/1990 | Hinlein. | |
| 4,922,447 | 5/1990 | Miura. | |
| 4,971,859 | 11/1990 | Kimura et al.. | |
| 5,161,076 | 11/1992 | Inumochi et al. | 360/104 |
| 5,198,945 | 3/1993 | Blaeser et al. | 360/104 |

FIG.8

CENTER MOMENT SUSPENSION ASSEMBLY

BACKGROUND OF THE INVENTION

1. Field of the Invention

The invention generally relates to magnetic recording systems and, in particular, to flexible suspension systems for magnetic recording heads.

2. Description of Related Art

A rigid disk drive or "hard disk" conventionally includes a magnetic recording head to encode date on a spinning recording disk. The magnetic recording head commonly consists of a magnetic transducer and a slider or hydrodynamic air bearing. The slider, having very flat, highly polished surfaces, "flies" above the spinning disk by floating on a boundary layer of air carried along the surface of the rotating disk.

In the assembled disk drive, a suspension suspends the magnetic head over the disk in a cantilever fashion. The suspension commonly includes a flexure which attaches the magnetic head to a free end of a suspension load beam. The load beam, in turn, is secured at a fixed end to an actuator suspension arm which moves the load beam and, thus, the magnetic head across the magnetic disk in operation.

Conventional rigid disk drives include a series of stacked disks positioned directly above one another. In order to decrease the size of the disk drive, the spacing between the disks becomes very important. Thus, disk drive manufacturers have become cognizant of the overall thickness of the suspension-magnetic head assembly (i.e., the dimension of the assembly measured in a direction perpendicular to the disk).

For accurate and dense data encoding, a read/write gap of the transducer must be maintained as close to the disk as possible at a constant height, typically about 6 micro-inches above the disk. The storage capacity of the disk is extremely dependent upon the height at which the read/write gap flies above the disk (i.e., the flying height). With an increase in the flying height of the read/write gap above the disk, the disk area encoded or read by the read/write gap increases. Hence, it is very important to keep the flying height as small as possible without having the magnetic head contact the disk in order to maximize the storage capacity of the recording disk; thus, it is preferred that the magnetic head fly at a constant height.

Magnetic disks, however, typically include undulations over the disk surface. To maintain a constant flying height, the magnetic head must follow the topography of the disk surface. Thus, the suspension must allow the magnetic head to roll around an x-axis (which aligns with the longitudinal axis of the load beam) and to pitch around a y-axis (which is orthogonal to the x-axis in the plane of the load beam). If the magnetic head does not follow the out of plane motion of the disk, the magnetic head will fly at a height greater than the desired flying height.

Additionally, the suspension should be extremely rigid in the x-y plane (i.e., in a plane parallel to the disk), to accurately place the magnetic head over the data track. That is, the suspension must not permit the load beam to move from side to side (i.e., yaw) in the x-y plane about its fixed end. Yawing of the magnetic head about the fixed end of the suspension moves the transducer across data tracks, causing the transducer to encode data outside of the desired track (i.e., causing "off track error").

Torsional resonance of the suspension also moves the magnetic head across data tracks. Torsional resonance typically occurs during data seek operations in which the actuator moves the suspension over the disk; other sources, including external disturbances, can also cause the suspension to resonate. The cross track movement of the magnetic head results because the amplitude of the resonance increases away from the longitudinal axis of the load beam, and thus, the greater the dimension between the magnetic head and the longitudinal axis of the load beam, the greater the displacement of the magnetic head across the disk surface due to torsional resonance of the load beam.

In the standard 3370-type suspension, as disclosed in U.S. Pat. No. 4,167,765 to Watrous, the flexure distances the magnetic head from the plane of the load beam. Thus, the geometry of prior suspension amplifies the magnitude of magnetic head displacement due to torsional resonances, leading to error in the positioning of the magnetic head.

This behavior not only reduces the track density, because wider tracks are necessary to compensate for the resulting movement of the magnetic head over the disk surface, but also interferes with the electronic data-track following capability of a control feedback system. During suspension resonance, extreme cross-track modulation of the transducer confuses the track following electronics and causes mechanical instability in the system. Potentially, actuator instability can lead to violent oscillations of the transducer suspension, causing the head to contact the disk and possibly destroy data.

A prior patent to Watrous, U.S. Pat. No. 3,931,641, discloses a suspension less susceptible to the effects of torsional resonance. The disclosed suspension includes a central finger with a cantilevered end which supports the magnetic head. Although the suspension allows the magnetic head to follow the disk topography, it is susceptible to slip-stick phenomenon. That is, during torsional resonance, the magnetic head yaws across the disk surface, deflecting the central finger in a plane parallel to the x-y plane. Due to frictional forces between the central finger and a load point of the suspension, the finger sticks in a position off of the undeflected longitudinal axis of the central finger (i.e., sticks in an "off-axis position"). The deflected central finger eventually springs back and causes cross track error.

U.S. Pat. No. 4,868,694 to Hagen discloses a flexure having greater radial stiffness to prevent the magnetic head from deflecting and sticking in an off-axis position. The disclosed suspension, however, does not provide enough flexibility to permit the head to follow out of plane motion of disk to minimize variations in flying height.

The standard 3370-type suspension additionally poses assembly problems. The flexure of the 3370-type suspension, as disclosed in the '765 patent, includes a protuberance or dimple which contacts and pivots about a load support point. In assembly, the magnetic head is preferably positioned to vertically align the center of gravity of the magnetic head with the dimple of the flexure. Precision positioning between the magnetic head and flexure, however, is difficult; the tolerances of the components and the tolerances of the tooling used to center the components stack up and make its very difficult to precisely control the position of the magnetic head relative to the dimple. Thus, although it is desired that the magnetic head center of gravity vertically aligns with the flexure dimple, assembled magnetic head/flexure assemblies seldom meet this requirement.

Prior suspension designs address one or more of the aforementioned design criteria. No single suspension design, however, adequately addresses and resolves all of the foregoing problems. Thus, a there is a need for a suspension which limits the effect of suspension torsional resonance on the magnetic head while providing sufficient flexibility to allow the magnetic head to follow the topography of the recording disk. In addition, there is a need for a suspension/magnetic head assembly which is readily assembled with the flexure to vertically align the center of gravity of the magnetic head with a protuberance.

SUMMARY OF THE INVENTION

The present invention overcomes the disadvantages of the prior suspension systems by providing a structure which reduces the effect of torsional resonance on the magnetic head. The suspension includes a rigid support member which defines a longitudinal axis and a bonding tab. The bonding tab has a central axis positioned substantially coaxially with the longitudinal axis of the support member. This configuration reduces the amplitude of displacement of the bonding tab due to torsional vibrations propagated along the support member by minimizing the distance between the longitudinal axis of the support member and the center axis of the bonding tab.

The suspension additionally includes two longitudinal flexible arms extending from opposite sides of the bonding tab in directions generally parallel to the longitudinal axis of the support member. The longitudinal flexible arms allow the bonding tab to roll around the longitudinal axis and reduce the tendency of the bonding tab to stick in an off-axis position by supporting the bonding tab at two points. The suspension further includes two transverse flexible arms which connect to the longitudinal arms opposite from the bonding tab. The transverse arms connect to the support member and allow the bonding tab to pitch around an intersecting axis which is generally perpendicular to the longitudinal axis.

In a preferred embodiment, the transverse arms extend across an aperture defined by the support member to form three adjacent open portions in the support member. The bonding tab is positioned between the transverse arms and is suspended therebetween by the longitudinal arms. The bonding tab, longitudinal arms and transverse arms preferably form a structure having a symmetric configuration, positioned about the longitudinal axis of the support member.

Another aspect of the invention involves a suspension including a generally rigid support member which defines a plane and a longitudinal axis. The suspension also includes a bonding tab having a center point positioned within the plane defined by the support member. Two flexible arms extend from opposite sides of the bonding tab which suspend the bonding tab.

In a preferred embodiment, the flexible arms extend along the longitudinal axis defined by the support member. The flexible arms allow the bonding tab to roll around the longitudinal axis. The center point remains positioned within the plane defined by the support member as the bonding tab rolls around the longitudinal axis. The suspension preferably additionally includes a load point support effectively positioned within the plane defined by the support member, and integrally formed with the bonding tab.

In another aspect of the preferred embodiment, two flexible transverse arms support the bonding tab and are positioned generally parallel to an intersecting axis that is generally perpendicular to the longitudinal axis of the support member. The flexible transverse arms allow the bonding tab to pitch around the intersecting axis. The center point remains positioned within the plane of the support member as the bonding tab pitches around the intersecting axis. In one embodiment, the transverse arms extend from opposite sides of the bonding tab.

A further aspect of the invention is a suspension for suspending a magnetic head above a spinning disk which includes a load beam defining a plane and having a formed area biasing the magnetic head towards the spinning disk. The formed area provides a preload on the magnetic head for controlling the flying height of the magnetic head above the spinning disk. The suspension additionally includes a bonding tab integrally formed with the load beam and a load support point integrally formed with the bonding tab.

In a preferred embodiment, the suspension additionally includes an arcuate arm which supports the load support point. The arcuate arm has an arcuate shape that extends out of the plane of the load beam and curves back in the proximal direction over the bonding tab to position the load support point effectively within the plane of the load beam. The bonding tab is positioned between the arcuate arm and the load beam.

Another aspect of the invention involves a magnetic head/suspension assembly which includes a magnetic head having a slider with a protuberance. The assembly additionally includes; a bonding tab defining an aperture which receives the protuberance of the magnetic head in assembly to precisely index the magnetic head with the bonding tab.

In a preferred embodiment, the protuberance has a spherical shape which partially inserts into a recess in the slider. The recess is formed by two orthogonal intersecting grooves which correspond with the longitudinal and transverse axes of the slider. The position of the recess coincides with the center of gravity of the magnetic head. The protuberance is preferably made of a non-magnetic material, such as, for example, glass or sapphire, and is affixed to the slider by an adhesive.

DETAILED DESCRIPTION OF PREFERRED EMBODIMENTS

Figure 1:
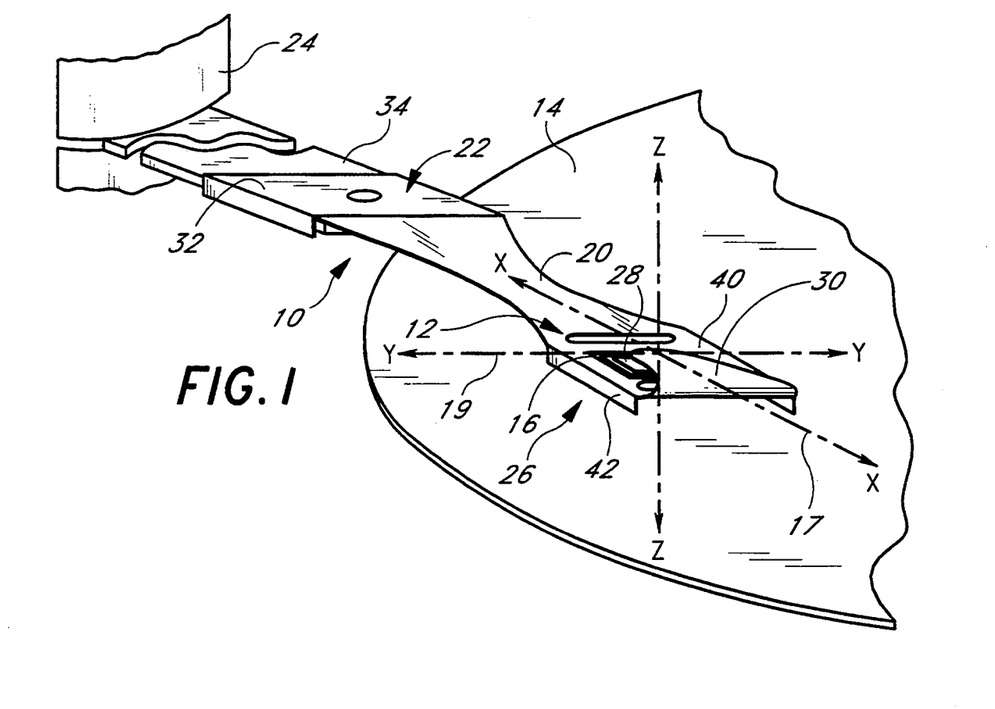
FIG. 1 is a perspective view of a suspension system in accordance with a preferred embodiment of the present invention, attached to an actuator and suspended over a recording disk.
Figure 5:
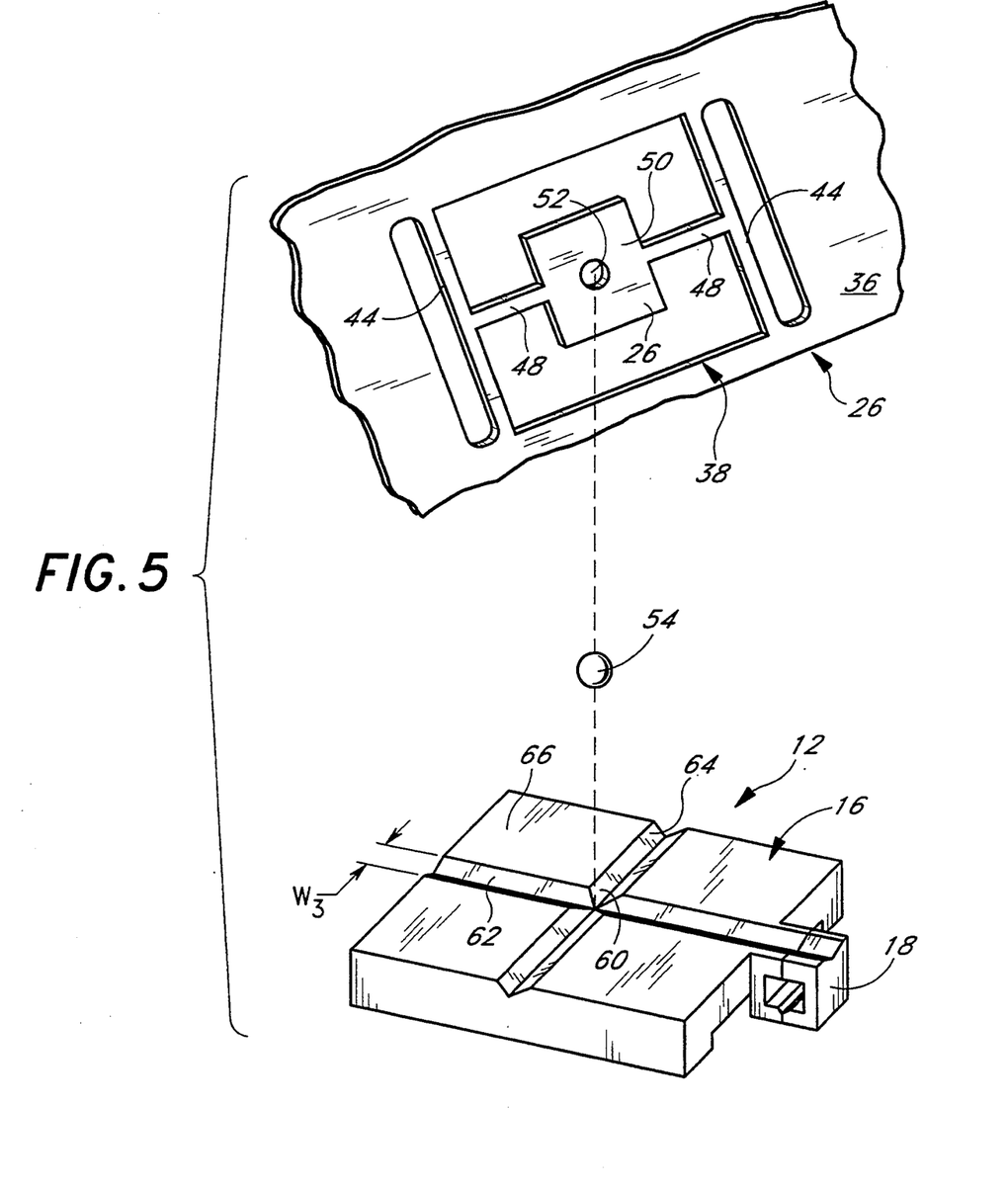
FIG. 5 is a partial exploded perspective view of the suspension system of FIG. 1.

FIG. 1 illustrates a preferred embodiment of the present suspension 10 suspending a magnetic head 12 above a rigid recording disk 14. The magnetic head 10 includes a slider or hydrodynamic air bearing 16 which flies above the spinning disk 14 and supports a magnetic read/write transducer 18 (FIG. 5). The suspension 10 provides the magnetic head 12 with flexibility in the roll and pitch directions. That is, the magnetic head 12 can roll around the longitudinal axis 17 of a load beam 20 of the suspension 10 and pitch around an intersecting axis 19 that is perpendicular to the longitudinal axis 17 in the plane of the load beam 20. Additionally, the suspension 10 reduces the effect of torsional vibrations propagating along the suspension 10 on the magnetic head 12. The suspension 10 also prevents the magnetic head 12 from sticking in a position off of the longitudinal axis 17 of the load beam 20.

For the purpose of describing the invention, a coordinate system is provided having coordinates oriented as follows: a "x-axis" coordinate coinciding with the longitudinal axis 17 of the load beam 20; a "z-axis" coordinate perpendicular to the plane defined by the load beam 20 and passing through the center of gravity of the magnetic head 12; and a "y-axis" coordinate orthogonal to the x-axis and to the z-axis. In addition, as used herein, "in the x-direction" is in a direction parallel to the x-axis, "in the y-direction" is in a direction parallel to the y-axis, and "in the z-direction" is in a direction parallel to the z-axis.

Figure 2:
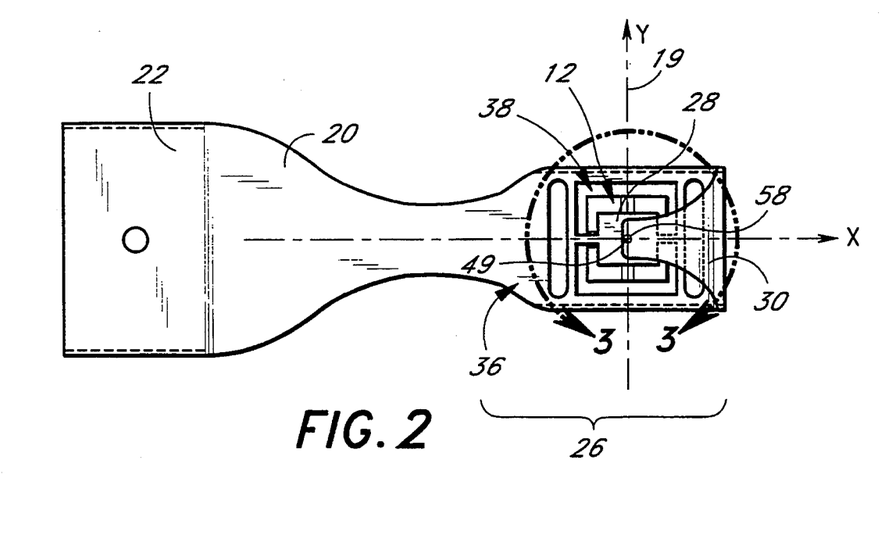
FIG. 2 is a top plan view of the suspension system of FIG. 1.

Referring to FIGS. 1 and 2, the suspension 10 includes the load beam 20 cantilevering from a formed area 22. The formed area 22 joins with a standard voice-coil powered actuator 24 in the assembled disk drive. A spring assembly 26 is connected to and is integrally formed with a distal end of the load beam 20. As used herein, "distal" and "proximal" refer to the proximity of the actuator 24. The spring assembly 26 includes a bonding tab 28 which joins with the magnetic head 12, and also includes an arcuate arm 30 which loops back in the proximal direction over the bonding tab 28.

The components of the suspension 10 form an integral structure. The suspension 10 preferably is constructed of non-magnetic 302 stainless steel, cold rolled to a yield strength of 186,000 pounds per square inch; however, other non-magnetic, high yield strength materials can be used as well. In a preferred embodiment, the suspension 10 is stamped or otherwise formed from a single sheet of stainless steel and is configured in accordance with the following description. The individual components of the suspension 10 will now be described in detail.

Referring to FIGS. 1 and 2, the formed area 22 forms a flat spring having a zero load position (i.e., an undeflected position) when the spring assembly 18 is on a side of a plane defined by the disk 14 opposite from the formed area 22. That is, in the orientation illustrated in FIG. 1, without the presence of the disk 14, the distal end of the suspension 10 rests in a relaxed state in a plane below the plane that the disk 14 would occupy if assembled; however, with the disk 14 installed, the suspension 10 is deflected upwardly so as to rest above the disk 14. In assembly with the magnetic head 12, the formed area 22 biases the transducer 18 against the disk 14. The formed area 22 provides a preload force equal, but opposite in direction to the hydrodynamic forces lifting the slider 16 upwardly when the transducer 18 is flying at the desired flying height. The formed area 22 maintains the transducer 18 at a generally constant height above the disk 14 as the magnetic head 12 follows the out of plane movement of the disk 14. The flying height is preferably about 6 micro-inches. As a result of the constant flying height of the magnetic head 12, the desired spacing between the magnetic head and disk is maintained and the storage capacity of the disk 14 is increased.

The formed area 22 advantageously additionally permits minor displacement of the read/write transducer 18 without substantial changes in the preload force. Thus, the spring constant (i.e., a constant representing force as a function of displacement) of the formed area 22 is sufficiently small so as to produce only slight changes in the preload force exerted on the magnetic head 12 as the magnetic head 12 follows the topography of the disk 14.

Referring to FIG. 1, the formed area 22 includes an extension 32 that is connected to a suspension arm 34 of the actuator 24 by spot welding, riveting or the like. In operation, the actuator 24 positions the magnetic head 12 over a proper data track by moving the suspension 10 across the disk 14.

As illustrated in FIG. 2, the load beam 20 extends in the distal direction from the formed area 22. The load beam 20 has a flat, hour-glass shape. The hour-glass shape of the load beam 20 provides generally constant stiffness in the y-direction along the length of the load beam 20. That is, if a force, having a vector perpendicular to the longitudinal axis of the load beam 20 and in the plane of the load beam 20, is applied, the stiffness or spring constant of the load beam 20 is substantially constant at any point along the length of the load beam 20. The stiffness of the load beam 20 in the x-y plane generally equals $3EI/L^3$, where E represents Young's modules of elasticity, I represents the moment of inertia of the load beam 20 and L represents the distance from the formed area 22 in the distal direction to the point where the force is acting. The load beam 20, having a generally rectangular cross-sectional shape, has a moment of inertia equal to $bh^3/12$, where b represents the dimension of the load beam 20 in the z-direction and h represents the dimension of the load beam 20 in the y-direction. Therefore, the stiffness of the load beam 20 is strongly related to the y-direction dimension of the load beam 20, h, and to the length of the load beam 20 at the point where the force is being applied, L (the stiffness of the load beam equaling $Ebh^3/4L^3$). The generally constant stiffness of the load beam 20 results because the dimension of the load beam 20 in the y-direction increases in the distal direction; that is, h increases as L increases to maintain a constant stiffness. Thus, the load beam 20 will deflect by a constant amount, regardless of where the force applies along the length of the load beam.

In addition, the hour-glass shape of the load beam 20 reduces the suspended mass. By reducing the mass suspended by the load beam 20, the displacement of the load beam 20 due to bending resonances (i.e., vibrations propagating in a sinusoidal fashion along the x-axis) is reduced, which aids in maintaining a constant flying height of the magnetic head 12.

Referring to FIG. 2, the spring assembly 26 includes a support structure 36 defining an aperture 38 having a size larger than the magnetic head 12. As best seen in FIG. 1, the support structure 36 includes a plate 40 which is coplanar with the load beam 20 and peripheral ribs 42 which extend in the z-direction towards the disk 14. The ribs 42 improve the rigidity of the support structure 36 to resist bending in the pitch direction (i.e., bending around the y-axis).

Figure 3:
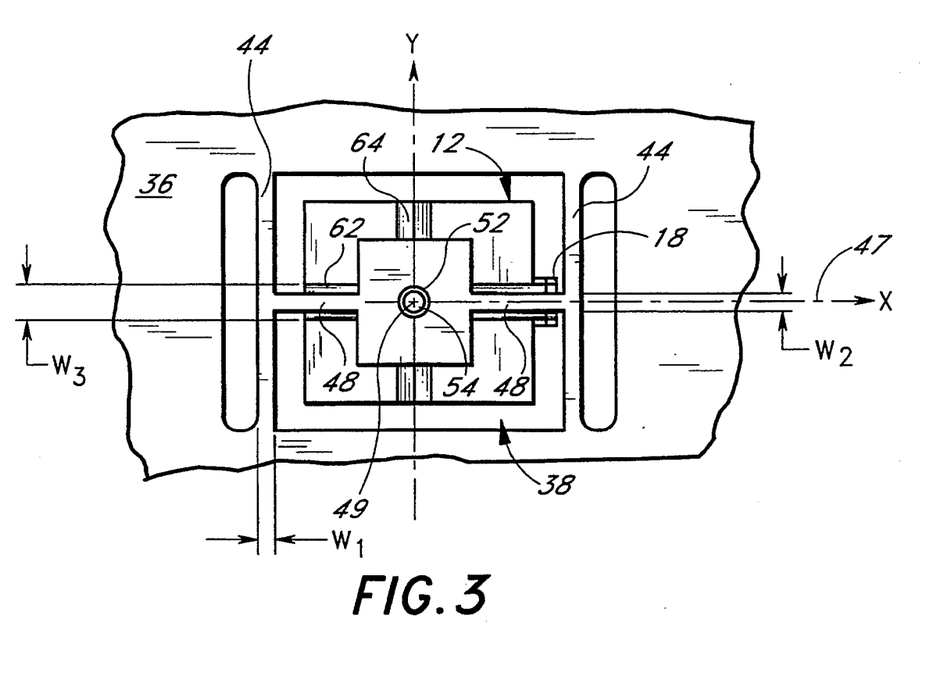
FIG. 3 is an enlarged partial plan view of the area within line 3—3 of FIG. 2.

As illustrated in FIG. 3, the spring assembly 26 includes a pair of transverse arms 44. The transverse arms 44 extend in the y-direction across the aperture 38 to form three adjacent open portions and connect at both ends with the support structure 36. The transverse arms 44 are preferably parallel to the y-axis.

A pair of longitudinal arms 48 suspend the bonding tab 28 between the transverse arms 44. The longitudinal arms 48 are positioned with their longitudinal axes substantially aligned with longitudinal axis 17 of the load beam 20. The longitudinal arms 48 bisect the transverse arms 44 and the shortest sides of the bonding tab 28. The resulting configuration is symmetric about the x and y axes.

The transverse arms 44 and the longitudinal arms 48 have a thickness measured in the z-direction equal to the thickness of the support structure 36. The width $W_1$ of the transverse arms 44 (i.e., the dimension measured in the x-direction) and the width $W_2$ of the longitudinal arms 48 (i.e., the dimension measured in the y-direction) are substantially smaller than the smallest side of the bonding tab 28.

The bonding tab 28 has a flat, rectangular shape of a thickness measured in the z-direction equal to the thickness of the longitudinal arms 48. The size of the bonding tab 28 is preferably about one-third of the size of the slider 16. That is, the bonding tab 28 has a dimension measured in the x-direction equal to about one-third the size of the slider 16 measured in the x-direction, and the bonding tab 28 has a dimension measured in the y-direction equal to about one-third the size of the slider 16 measured in the y-direction. The bonding tab 28 defines a longitudinal center line 47 parallel to the x-axis, and has a center point 49 located at the center of the rectangular shape on the center line 47, as illustrated in FIGS. 2 and 3.

Figure 4:
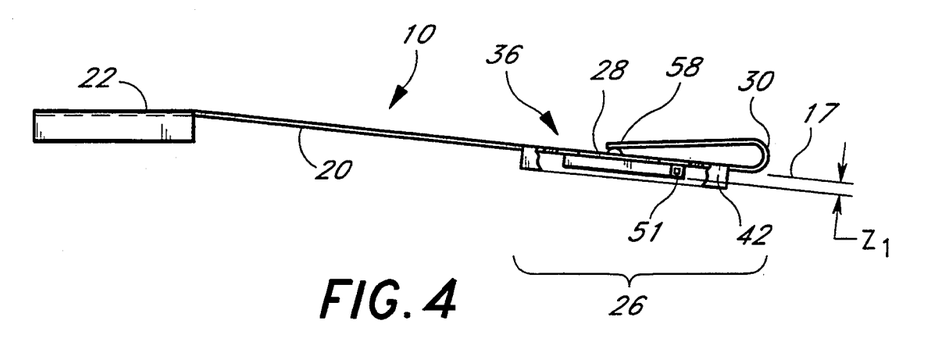
FIG. 4 is an elevational view of the suspension system of FIG. 2.

As seen in FIGS. 3 and 4, the bonding tab 28 lies in the plane of the load beam 20. The bonding tab 28 is positioned to align its center line 47 with the longitudinal axis 17 of the load beam 20. In this position, the center point 49 falls within the plane of the load beam 20. The resulting geometry, as best seen in FIG. 4, minimizes the distance $Z_1$ between the longitudinal axis 17 of the load beam 20 and a read/write gap 51 of the transducer 18. By bringing the bonding tab 28 into the plane of the suspension 10 and positioning the bonding tab 28 symmetrically about the longitudinal axis 17 of the load beam 20, the magnitude of displacement caused by torsional vibrations is minimized. The geometry also reduces the overall dimension of the suspension 10 in the z-direction, thereby reducing the disk to disk spacing of the disk drive.

The spring assembly 26 prevents the magnetic head 12 from sticking in an off axis position by suspending the bonding tab 28 from two points. The two longitudinal arms 48 permit the magnetic head to roll about the x-axis, but do not allow the bonding tab 28 to yaw by a significant amount within the x-y plane (i.e., to rotate by a significant amount about the z-axis). Thus, the longitudinal arms 48 maintain the alignment between the longitudinal axis 17 of the load beam 20 and the center line 47 of the bonding tab 28. The transverse arms 44 also aid in preventing the bonding tab 28 from yawing within the x-y plane. As a result, the spring assembly 26 prevents the magnetic head 12 for experiencing slip-stick phenomenon as the bonding tab 28 is restrained from substantial movement within the x-y plane.

Although the bonding tab 28 in the present embodiment directly connects to two longitudinal arms 48 which connect to two transverse arms 48, it is understood that two transverse arms, which connect to two longitudinal arms, could directly connect to the bonding tab 28 to achieve a number of the advantages of the present invention.

Figure 6:
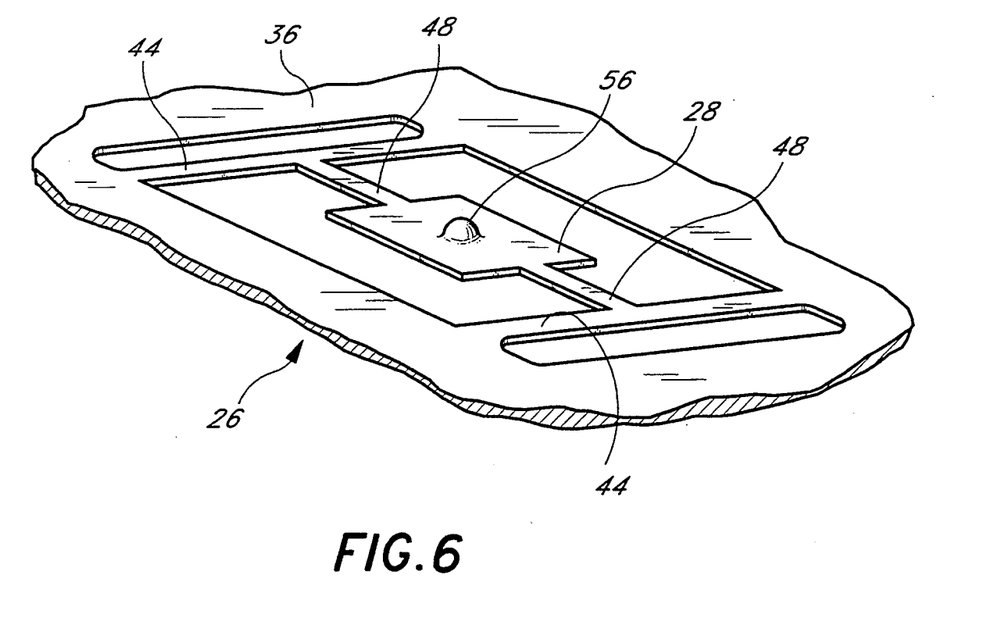
FIG. 6 is a partial perspective view of a suspension in accordance with another preferred embodiment of the present invention.

The bonding tab 28, as illustrated in FIGS. 3 and 5, defines an aperture 52 positioned about the center point 49 of the rectangular shape. The aperture 52 receives a protuberance or fulcrum element 54 of the magnetic head 12 in assembly, as discussed in detail infra. Alternatively, as illustrated in FIG. 6, the bonding tab 28 can include a dimple 56 in place of the aperture 52.

Referring to FIGS. 2 and 4, the spring assembly 26 additionally includes the arcuate arm 30 extending from the distal end of the support structure 36. The arcuate arm 30 has an arcuate shape extending in the distal direction out of the plane of the load beam 20 and away from the disk 14. The arcuate arm 30 curves back in the proximal direction above the bonding tab 28 and terminates at a load support point 58 which contacts the protuberance 54 of the magnetic head 12 (or alternatively, the dimple 56 of the bonding tab 28) in assembly.

As best seen in FIG. 4, the load support point 58 is positioned slightly above the bonding tab 28 to effectively position the load support point 58 within the plane of the load beam 20. Specifically, the distance in the z-direction between the plane of the load beam 20 and the load support point 58 is desirably not greater than 0.0050 inch. To position the load support point 58 accordingly, the arcuate arm 30 has a sufficiently small radius of curvature which defines a generally "u"-shaped curved surface of the arcuate arm 30 which loops from the distal direction back towards the proximal direction. The resulting configuration minimized the maximum z-direction dimension of the suspension 10 and thus minimizes disk to disk spacing in an assembled disk drive.

Referring to FIG. 5, the slider 16 includes a central recess 60 which receives the protuberance 54 of the magnetic head 12. Although the present embodiment is illustrated as comprising a twenty-five percent scale monolithic head (i.e., the slider has a size roughly equal to 0.0040 inch in the x-direction and 0.0030 inch in the y-direction), it is understood that the present invention can be used with any size and type of integrated magnetic head.

The position of the central recess 60 vertically aligns with the center of gravity of the magnetic head 12. Two orthogonal grooves 62, 64 form the central recess 60. In a preferred embodiment, the orthogonal grooves 62, 64 correspond with the longitudinal axis and transverse axis of the magnetic head 12, bisecting the shorter and larger sides of the slider 16, respectively. The grooves 62, 64 preferably have "v"-shapes in cross section which extend into the slider 16 from a mounting surface 66. As illustrated in FIG. 5, the mounting surface 66 of the slider 16 joins with a bonding tab mounting surface 50 in assembly.

As illustrated in FIG. 3, the longitudinal groove 62 has a dimension $W_3$, measured in the y-axis direction at the mounting surface 66, sufficiently sized to permit the free rotation of the longitudinal arms 48 positioned within the longitudinal grooves 62.

Referring to FIG. 5, the protuberance 54 preferably has a spherical shape sized to partially fit into the central recess 60 and to partially extend through the bonding tab aperture 52. The protuberance 54 is bonded to the slider 16 using an adhesive. In assembly with the bonding tab 28, the protuberance 54 extends thought the bonding tab aperture 52 and contacts the load point support 58. The load point support 58 functions as a fulcrum about which the protuberance 54 pivots, as described in detail infra.

In a preferred embodiment, built on a twenty-five percent level, the bonding tab 28 has a width measured in the y-direction equal to about 0.0010 inch and a length measured in the x-direction equal to about 0.0015 inch. The bonding tab aperture 52 has a diameter size about 0.0001 to 0.00015 inch larger than the diameter of the protuberance 54. The diameter of the bonding tab 52 aperture preferably equals about 0.0008 inch and the spherical diameter of the protuberance 54 equals about 0.0007 inch. The width $W_2$ of the longitudinal arms 48 equals about 0.0004 inch and the width $W_2$ of the longitudinal groove equals 0.00046 inch to provide clearance between the longitudinal arms 48 and the slider 16.

In assembly, the protuberance 54 sits in the central recess 60 of the slider 16, which is generally positioned in vertical alignment with the center of gravity of the magnetic head 12 (i.e., is positioned directly above the magnetic head center of gravity along the z-axis), and is bonded in place using an adhesive. The slider 16 is subsequently bonded to the bonding tab 28 using an adhesive with glass beads. The grooves 62, 64 in the slider 16 permit visual inspection of the bond joint between the slider 16 and the bonding tab 28. The uniformity of the bond thickness (i.e., the dimension of the bond measured in the z-direction) is thus easily inspected.

With the slider 16 bonded to the mounting surface 50 of the bonding tab 28, a portion of the protuberance 54 protrudes through the bonding tab aperture 52 and projects slightly above the plane of the load beam 20 away from the recording disk 14. The load support point 58, positioned at the end of the arcuate arm, contacts the protuberance 54. Thus, the load support point 58 acts at a point effectively in the x-y plane directly above the center of gravity of the magnetic head 12 (i.e., in vertical alignment with the magnetic head center of gravity along the z-axis).

The protuberance 54/bonding tab aperture 52 interaction thereby precisely indexes the slider 16 relative to the load support point 58. By laser cutting the grooves 62, 64 forming the central recess 60, by processes known in the art, the position of the central recess 60 can be controlled within ±40 micro-inches of the actual center of gravity of the magnetic head 12. As a result, the center of gravity of the magnetic head 12 can be aligned in the z-direction with the load support point 58 within ±100 micro-inches.

By integrally forming the bonding tab 28 with the load beam 20 and load support point 58, the design eliminates the manufacturing step of welding a flexure to the load beam, a process which commonly produces misalignment between the components. In addition, the integral structure eliminates the need to weld the load support point in place.

In operation, the slider 16 flies on a boundary layer of air created by the spinning recording disk 14. The formed area 22 provides a preload equal, but opposite to the hydrodynamic forces supporting the magnetic head 12. At a set equilibrium position, the magnetic head 12 flies at a desired height. The flying height preferably remains constant to improve the storage capacity of the magnetic disk 14, as discussed above.

The configuration of the spring element 26 permits the magnetic head 12 to follow the topography of the disk to maintain a constant flying height. The thin, narrow longitudinal arms 48 have a significantly small spring constant to permit rotational displacement of the arms 48 with the application of a small force. Thus, minimal variations in the distance between the magnetic head 12 and the disk 14, that disturb the equilibrium between the preload force and the hydrodynamic force, rotationally displace the longitudinal arms 44. Such displacement permits the magnetic head to roll around the longitudinal axis 17 to follow the out of plane movement of the disk 14. Similarly, the thin, narrow transverse arms 48 permit the magnetic head 12 to pitch around the intersecting axis 19.

In addition, the spring constant of the longitudinal arms 48 and of the transverse arms 44 can be smaller than prior suspensions which somewhat reduced the effects of slip-stick phenomenon by stiffening the cantilevered bonding tab structure, because the spring element 26 is not susceptible to slip-stick phenomenon.

As the magnetic head 12 pitches and rolls to follow the topography of the disk 14, the protuberance 54 (or dimple 56) pivots about the load support point 58. The center point 49 of the bonding tab 28, however, remains in the plane of the load beam 20 as the magnetic head 12, and thus part of the bonding tab 28, pitches and rolls in and out of the plane of the load beam 20.

The minimized distance $Z_1$ between the read/write transducer 51 and the longitudinal axis 17 of the load beam 20 minimizes the amplitude of magnetic head 12 displacement within the x-y plane due to torsional resonance of the load beam 20. Thus, the spring assembly 26 reduces the occurrences of cross-track error during operation of the disk drive.

Figure 7:
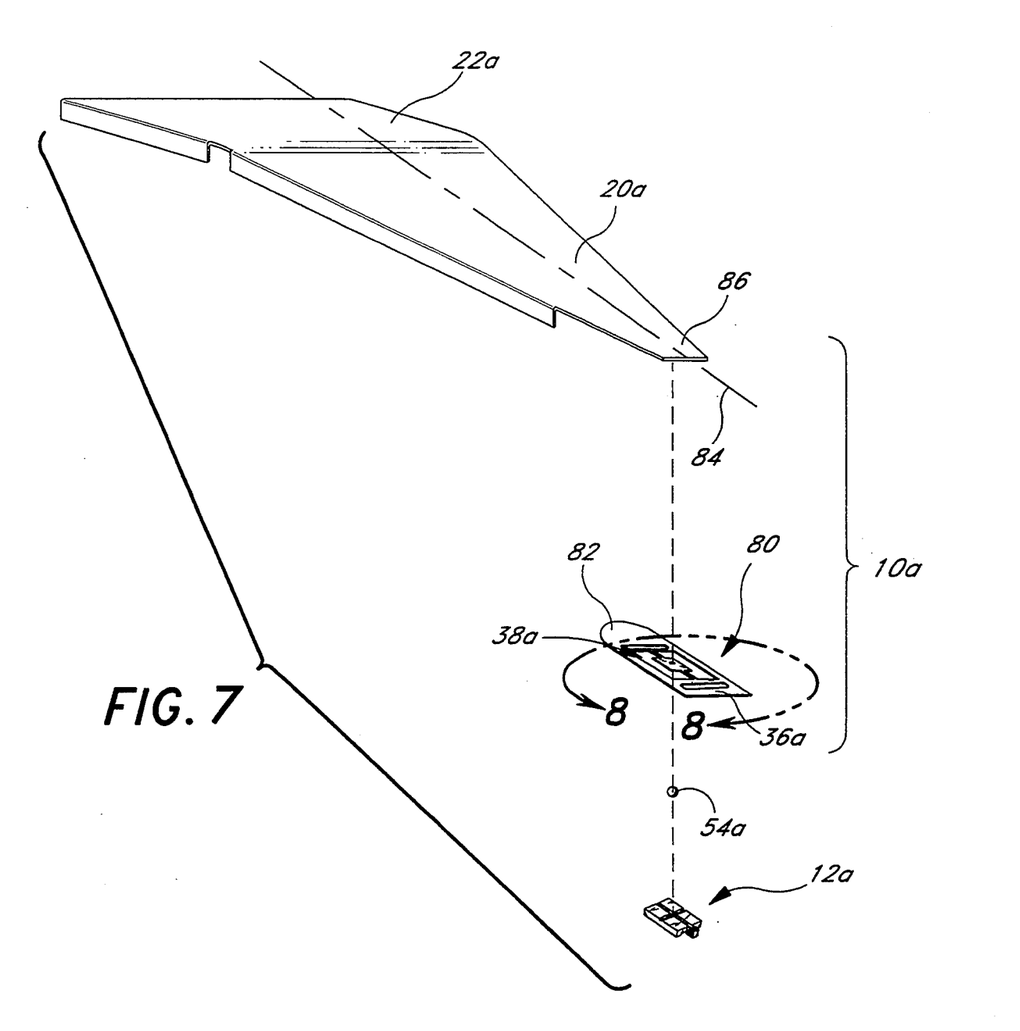
FIG. 7 is an exploded perspective view of a further preferred embodiment in accordance with the present invention.
Figure 8:
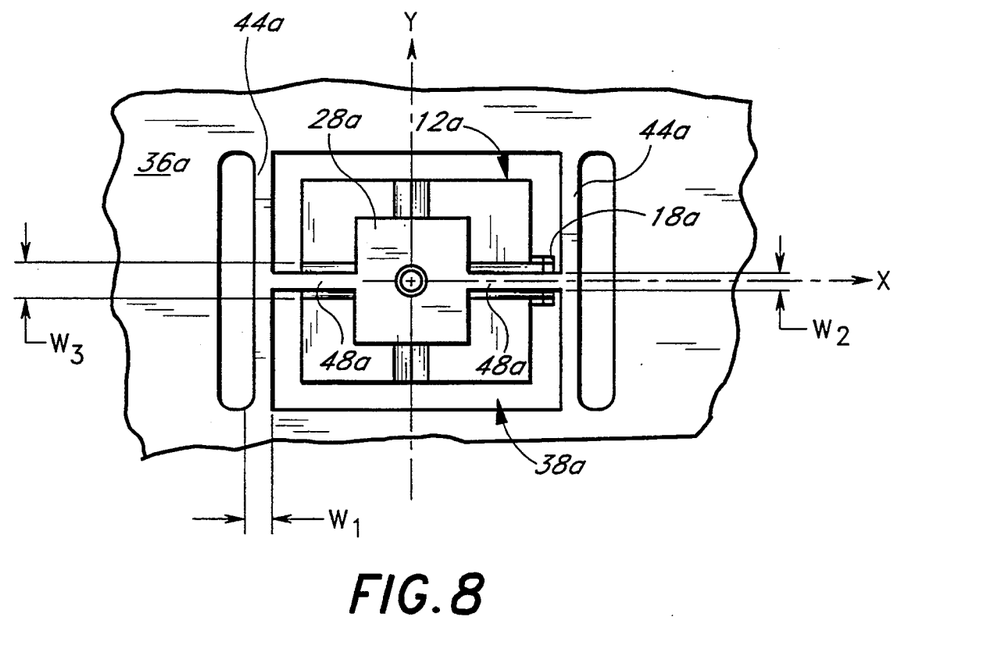
FIG. 8 is an enlarged partial plan view of the area within line 8—8 of FIG. 7.

FIGS. 7 and 8 illustrate an alternative embodiment of the present invention applying a number of the aspects and advantages described above to a flexure 80 which attaches to a load beam 20a. Where appropriate, like numbers within an "a" suffix are used to indicate like parts of the two embodiments for ease of understanding. Although FIG. 7 illustrates the load beam 20a as having a configuration in accordance with a standard 3370-type design, it is understood that the present flexure 80 can be used with other load beam designs as well.

The flexure 80, as illustrated in FIG. 7, includes an extension 82 which connects with the load beam 20a via spot welds in assembly. The flexure 80 additionally includes a support structure 36a extending in the distal direction from the extension 82. The support structure 36a defines an aperture 38a larger than a magnetic head 12a.

Referring to FIG. 8, the flexure 80 additionally includes a pair of transverse arms 44a extending in the y-direction across the aperture 38a and connecting with the support structure 36a. The transverse arms 44a are preferably parallel to the y-direction coordinate and define three adjacent open portions with the support structure 36a. A pair of longitudinal arms 48a suspends a rectangular bonding tab 28a between the transverse arms 49a. The longitudinal arms 48a have longitudinal axes aligned with the longitudinal axis 84 of the suspension 10a in assembly. The longitudinal arms 48a bisect the transverse arms 44a and the shortest sides of the bonding tab 28a. Thus, the resulting configuration is symmetric about the x and y axes.

The transverse arms 44a and the longitudinal arms 48a have a thickness measured in the z-direction equal to the thickness of the support structure 36a. The width $W_1'$ of the transverse arms 44a (i.e., the dimension measured in the x-direction) and the width $W_2'$ of the longitudinal arms (i.e., the dimension measured in the y-direction) are substantially smaller than a smallest side of the bonding tab 28a.

The bonding tab 28 has a flat, rectangular shape of a thickness (measured in the z-direction) equal to the thickness of the longitudinal arms 48a. The bonding tab, as illustrated in FIG. 8, defines an aperture 52a positioned approximately at the center of the rectangular shape. The aperture 52a receives a protuberance or fulcrum element 54a of the magnetic head 12 in assembly, as discussed in detail above in connection with the first embodiment. Alternatively, the bonding tab 28 can include a dimple 56a in the place of the aperture 52a.

Referring to FIG. 7, the magnetic head 12a joins with the bonding tab 28a as previously described above in connection with the first embodiment. As assembled with the load beam 20a, the protuberance 54a protrudes through the load beam aperture 52a and contacts the distal end 86 of the load beam 20a. With the magnetic head 12a flying over the recording disk 14a, the protuberance 54a pivots about the distal end 86 as the magnetic head 12a follows the topography of the disk 14a.

The flexure 80 provides flexibility to allow the magnetic head 12a to pitch and roll with little resistance. The flexure 80, however, prevents the magnetic head 12a from sticking in a position off of the longitudinal axis of the flexure 80. In addition, the flexure 80 is easily integrated into current suspension manufacturing processes to achieve many of the aforementioned advantages.

Although this invention is described in terms of certain embodiments, other embodiments will be apparent to those of ordinary skill in the art and are also within the scope of this invention. Accordingly, the scope of the invention is intended to be defined by the claims which follow.

What is claimed is:

1. A suspension for suspending a magnetic head over a spinning disk, wherein said magnetic head flies above said spinning disk, said suspension comprising:
   a generally rigid support member defining a plane and a longitudinal axis;
   a bonding tab having a center point positioned within the plane defined by said support member; and
   two flexible transverse arms supporting said bonding tab and being positioned generally parallel to an intersecting axis that is generally perpendicular to said longitudinal axis of said support member allowing said bonding tab to pitch around said intersecting axis, said transverse arms extending from opposite sides of said bonding tab, wherein said center point remains positioned within said plane as said bonding tab pitches around said intersecting axis.

2. The suspension of claim 1, additionally comprising a load support point being integrally formed with said bonding tab.

3. A suspension for suspending a magnetic head above a spinning disk, wherein said magnetic head flies above said spinning disk, said suspension comprising:
   a load beam defining a plane and having a formed area biasing said magnetic head towards the spinning disk to provide a preload on said magnetic head for controlling said flying height;
   a bonding tab being integrally formed with said load beam, said bonding tab having a center point positioned within the plane defined by said load beam; and
   a load support point being integrally formed with said bonding tab.

4. The suspension of claim 3, additionally comprising two flexible longitudinal arms extending from opposite sides of said bonding tab and being positioned generally parallel to a longitudinal axis of said load beam allowing said bonding tab to roll around said longitudinal axis, wherein said center point remains positioned within said plane as said bonding tab rolls around said longitudinal axis.

5. The suspension of claim 4, additionally comprising a load point support positioned effectively within said plane defined by said support member.

6. The suspension of claim 4, wherein said longitudinal arms extend from said bonding tab along the longitudinal axis of said support member.

7. The suspension of claim 4, additionally comprising two transverse flexible arms, each transverse arm connected to an end of one of said longitudinal arms opposite from said bonding tab, said transverse arms connected to said load beam allowing said bonding tab to pitch around an intersecting axis that is generally perpendicular to said longitudinal axis of the load beam.

8. The suspension of claim 7, wherein said transverse arms extend across an aperture defined by said load beam to form three adjacent open portions in said load beam, said bonding tab being positioned between said transverse arms and connected to said transverse arms by said longitudinal arms to suspend the bonding tab within the aperture.

9. The suspension of claim 8, wherein a structure defined by said bonding tab, longitudinal arms, and transverse arms has a symmetric configuration.

10. The suspension of claim 9, wherein said structure is positioned symmetrically about said longitudinal axis of said load beam.

11. The suspension of claim 8, wherein said aperture of said load beam has a size greater than the size of the magnetic head attached to the bonding tab.

12. A suspension for suspending a magnetic head above a spinning disk, wherein said magnetic head flies above said spinning disk, said suspension comprising:
   a load beam defining a plane and having a formed area biasing said magnetic head towards the spinning disk to provide a preload on said magnetic head for controlling said flying height;
   a bonding tab being integrally formed with said load beam;
   a load support point being integrally formed with said bonding tab; and
   an arcuate arm, said load support point being positioned on said arcuate arm and said bonding tab being positioned between said arcuate arm and said load beam, said arcuate arm having a arcuate shape that extends out of the plane of said load beam and curves back in the proximal direction over said bonding tab to position said load support point effectively within the plane of said load beam.

13. A suspension for suspending a magnetic head above a spinning disk, wherein said magnetic head flies at a generally constant flying height above said spinning disk, said suspension comprising:
a load beam defining a plane and having a formed area biasing said magnetic head towards the spinning disk to provide a preload on said magnetic head for controlling said flying height;
a bonding tab being integrally formed with said load beam, said bonding tab defining an aperture to receive a protuberance of said magnetic head for precisely indexing said magnetic head with said bonding tab; and
a load support point positioned effectively within said plane defined by said lead beam, said load support point contacting said protuberance such that said protuberance acts as a fulcrum for said bonding tab.

14. A suspension for suspending a magnetic head above a spinning disk to enable said magnetic head to fly above the disk and to follow the topography of the disk, said suspension comprising:
a formed area which biases said magnetic head towards the spinning disk;
a load beam defining a longitudinal axis and a plane, and having a cantilevered end, said load beam decreasing in transverse width in the direction away from said formed area; and
a spring assembly connected to said cantilevered end of said load beam, said spring assembly comprising:
a support structure having a transverse width wider than at least a portion of said load beam, said load beam increasing in transverse width from said portion of said load beam toward said support structure of said spring assembly;
a bonding tab having a central axis positioned substantially co-axially with said longitudinal axis of said load beam, thereby reducing the amplitude of displacement of said bonding tab due to torsional vibrations propagating along said load beam, said bonding tab further having a mounting surface to join with said magnetic head;
two longitudinal flexible arms extending from opposite sides of said bonding tab and being positioned generally parallel to said longitudinal axis of said support member allowing said bonding tab to roll around said longitudinal axis and reducing the tendency of the bonding tab to stick in an off-axis position;
two transverse flexible arms, each transverse arm connected to an end of one of said longitudinal arms opposite from said bonding tab, said transverse arms connected to said support structure allowing said bonding tab to pitch around an intersecting axis that is perpendicular to said longitudinal axis; and
a load support point contacting a fulcrum element coupled to said magnetic head, said load support point being positioned on a side of said bonding tab opposite from said mounting surface.

15. The suspension of claim 14, wherein said load beam and said spring assembly are integrally formed.

16. The suspension of claim 14, wherein said transverse arms extend across an aperture defined by said support structure to form three adjacent open portions in said support structure, said bonding tab being positioned between said transverse arms and connected to said transverse arms by said longitudinal arms to suspend said bonding tab within said aperture.

17. A suspension for suspending a magnetic head above a spinning disk to enable said magnetic head to fly above the disk and to follow the topography of the disk, said suspension comprising:
a load beam defining a longitudinal axis and a plane, and having a cantilevered end; and
a spring assembly connected to said cantilevered end, said spring assembly comprising:
a support structure;
a bonding tab having a central axis positioned substantially co-axially with said longitudinal axis of said load beam, thereby reducing the amplitude of displacement of said bonding tab due to torsional vibrations propagating along said load beam, said bonding tab further having a mounting surface to join with said magnetic head;
two longitudinal flexible arms extending from opposite sides of said bonding tab and being positioned generally parallel to said longitudinal axis of said support member allowing said bonding tab to roll around said longitudinal axis and reducing the tendency of the bonding tab to stick in an off-axis position;
two transverse flexible arms, each transverse arm connected to an end of one of said longitudinal arms opposite from said bonding tab, said transverse arms connected to said support structure allowing said bonding tab to pitch around an intersecting axis that is perpendicular to said longitudinal axis; and
a load support point contacting a fulcrum element coupled to said magnetic head, said load support point being positioned on a side of said bonding tab opposite from said mounting surface; and
an arcuate arm, said load support point being positioned on said arcuate arm and said bonding tab being positioned between said arcuate arm and said load beam, said arcuate arm having a arcuate shape that extends out of the plane of said load beam and curves back in the proximal direction over said bonding tab to position said load support point effectively within the plane of said load beam.

* * * * *